Figure 15:
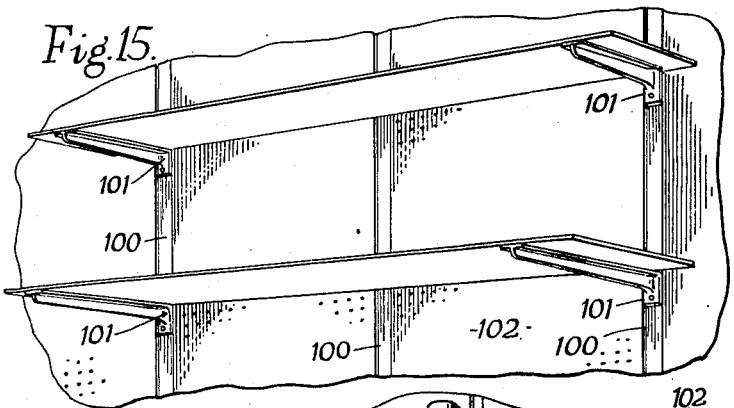

May 24, 1960
A. PENN
2,937,766
SUPPORTING STRUCTURES FOR SHELVES, DISPLAY
FITTINGS AND SIMILAR ARTICLES
Filed Oct. 27, 1955
5 Sheets-Sheet 1
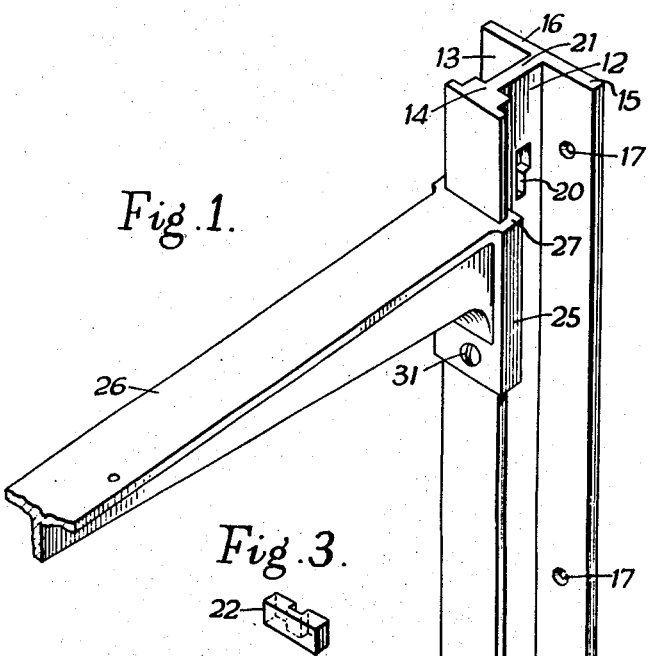
Fig.1.
Fig.3.
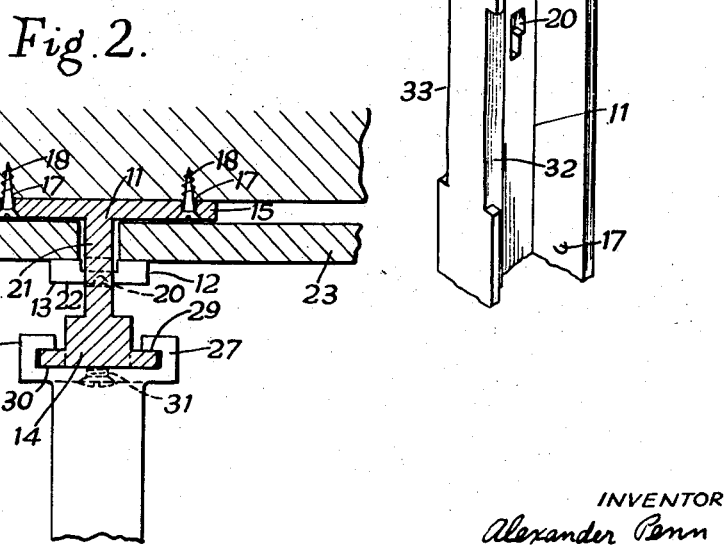
Fig.2.
INVENTOR
Alexander Penn
BY
Ralph B. Stewart
ATTORNEY

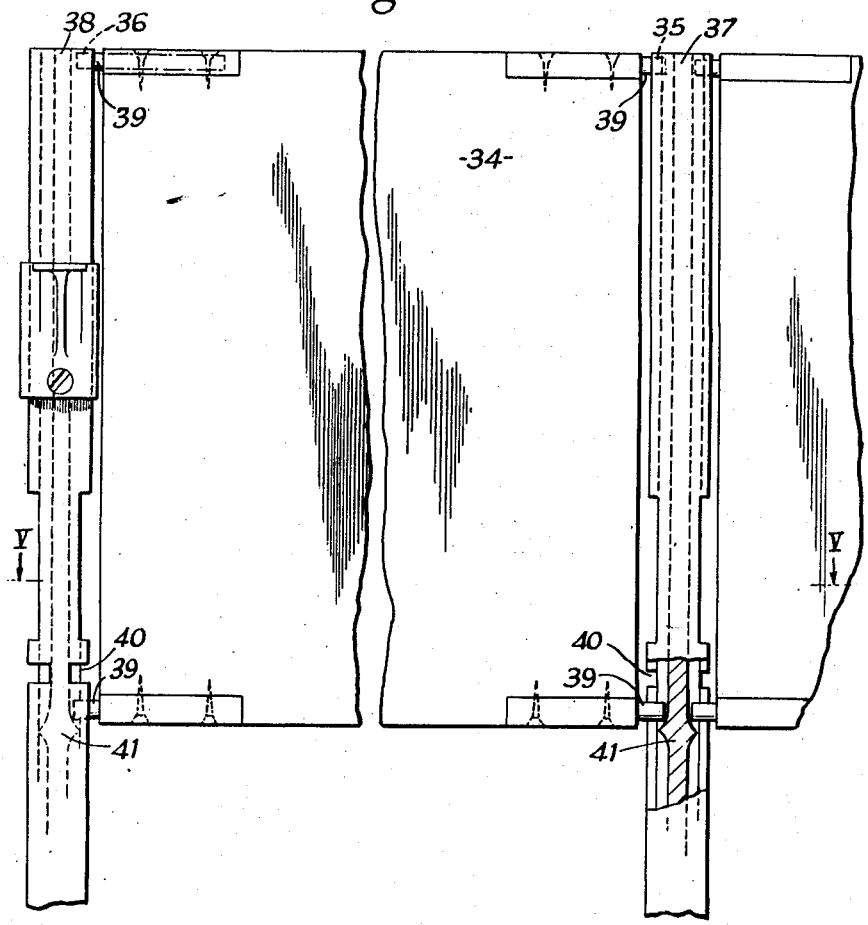
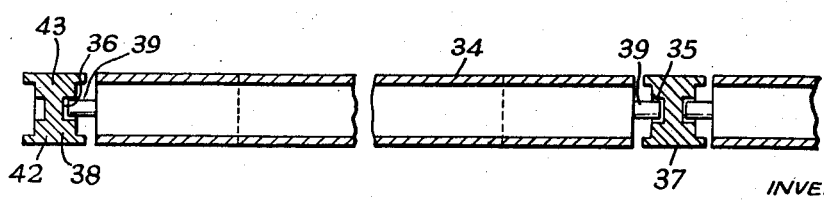

May 24, 1960                A. PENN                2,937,766
         SUPPORTING STRUCTURES FOR SHELVES, DISPLAY
                  FITTINGS AND SIMILAR ARTICLES
Filed Oct. 27, 1955                        5 Sheets-Sheet 3
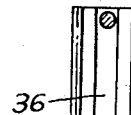
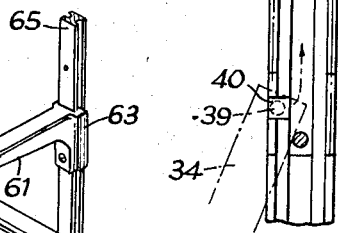
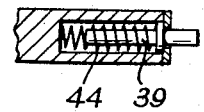
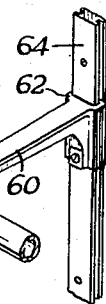
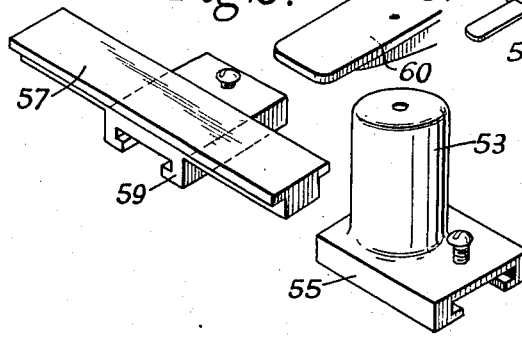
INVENTOR
Alexander Penn
BY
Ralph B. Stewart
ATTORNEY May 24, 1960
A. PENN
2,937,766
SUPPORTING STRUCTURES FOR SHELVES, DISPLAY
FITTINGS AND SIMILAR ARTICLES
Filed Oct. 27, 1955
5 Sheets-Sheet 4
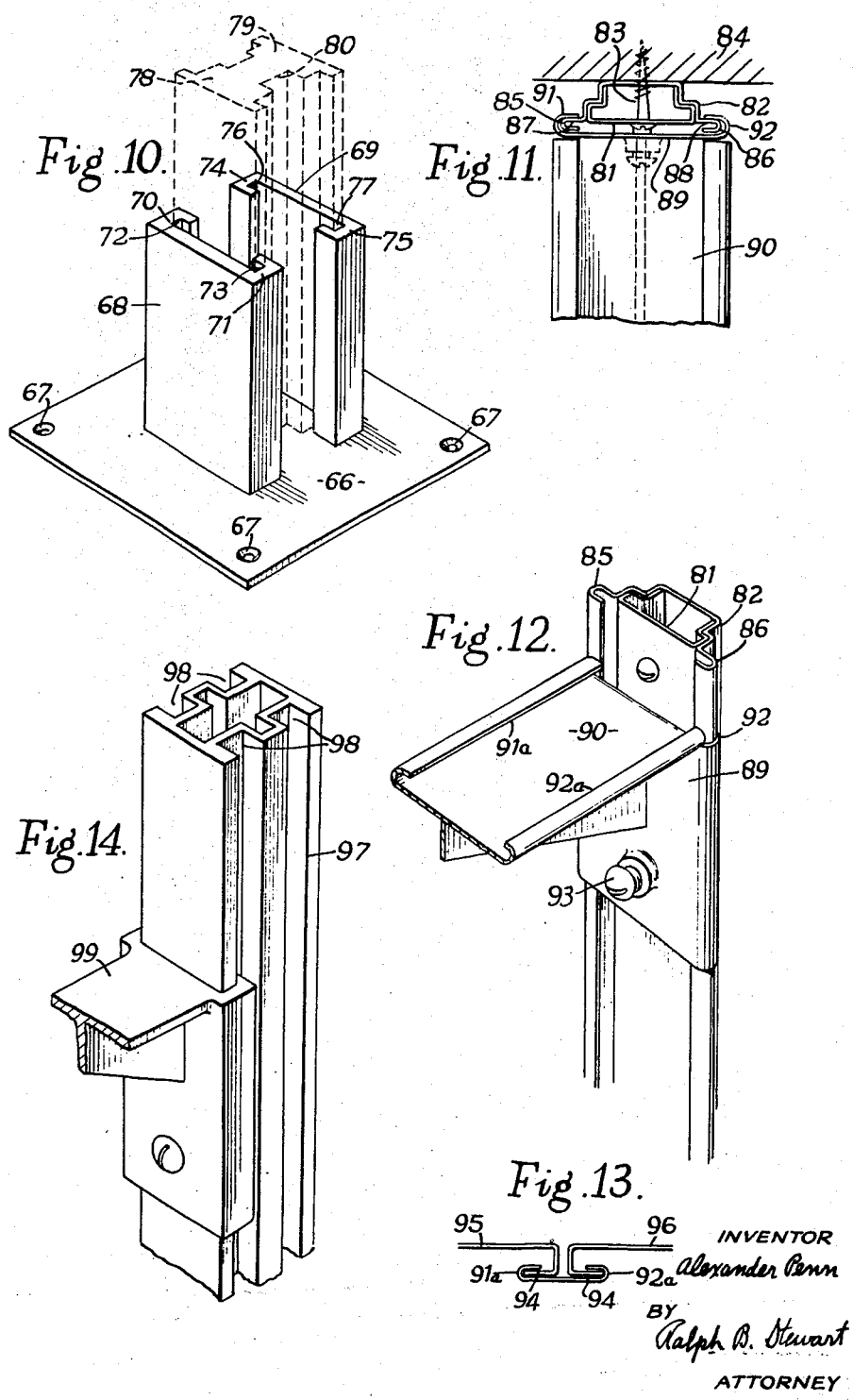

INVENTOR
Alexander Penn
By Ralph B. Stewart
ATTORNEY

United States Patent Office 2,937,766
Patented May 24, 1960

2,937,766

SUPPORTING STRUCTURES FOR SHELVES, DISPLAY FITTINGS AND SIMILAR ARTICLES

Alexander Penn, London, England, assignor to John Wilkins & Co. Limited, London, England Filed Oct. 27, 1955, Ser. No. 543,239

Claims priority, application Great Britain Nov. 1, 1954

4 Claims. (Cl. 211—147)

This invention is concerned with improvements in and relating to supporting structures for shelves, display fittings and similar articles.

It is an object of the invention to provide an effective supporting structure of the kind referred to in which adjustments of spacings and heights of fittings may easily be varied at will.

It is a further object to provide such a supporting structure which is neat and unobtrusive in appearance.

It is still a further object to provide a supporting structure which may also be used for a wide variety of presentations in the display of merchandise with varying backgrounds provided by removable panels.

The basic elements of the supporting structure of the invention are a strip-like supporting member provided with a longitudinally extending channel in at least one side thereof and with a front part, forwardly of said channel of T-shaped cross-section and a clamping member embracing the sidewardly extending portions of the T-sectioned front part in grooves formed in the facing surfaces of rearwardly extending cheeks forming part of the clamping member, the clamping member being in free sliding engagement on the supporting member and being provided with means for locking it in position on the supporting member.

The strip-like supporting member is more usually formed with a longitudinally extending channel in each side thereof and the supporting structures of the invention are normally formed of a plurality of supporting members spaced from one another and panels extending between each pair of adjacent members and held in position in the longitudinally extending channels. The structures may, however, be formed of one pair of supporting members.

The structures may be free-standing or attached to a wall by screws passing through holes formed in the rear side walls of the channels which walls may be extended sidewards for this purpose. The screws will be obscured by the panels extending between the supporting members. Alternatively when the structure is adapted for attachment to a wall the longitudinally extending channel or channels in the side or sides of the supporting member thereof may be formed between the supporting member and the wall, the wall in such cases forming the rear side walls of the channels. In the latter construction the screws attaching the supporting member to the wall may pass through the body of the supporting member.

When the structures are free-standing both the front and rear parts of the supporting members on either side of the channels in the sides thereof may be of T-shaped cross-section and adapted to receive clamping members.

Figure 16:
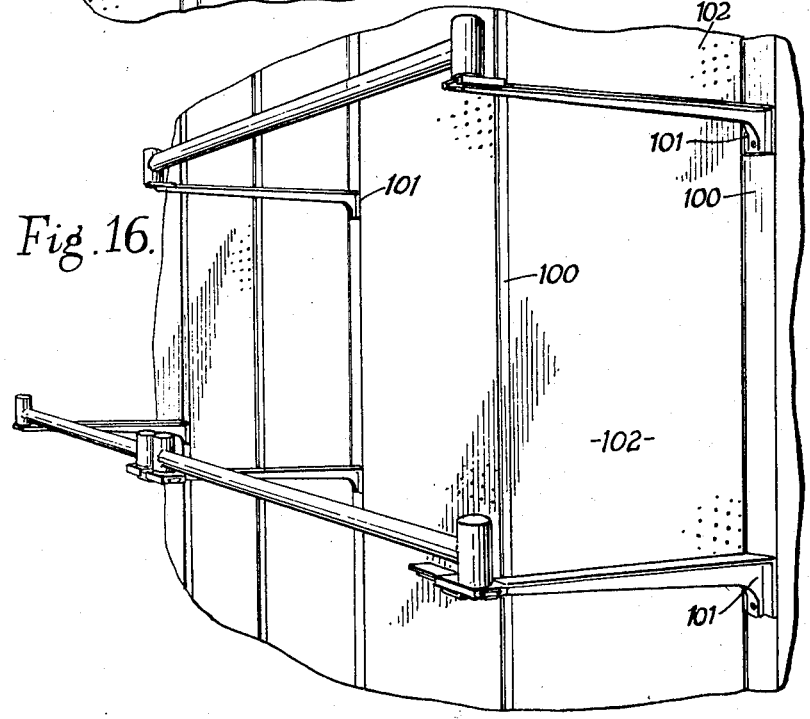
Figure 17:
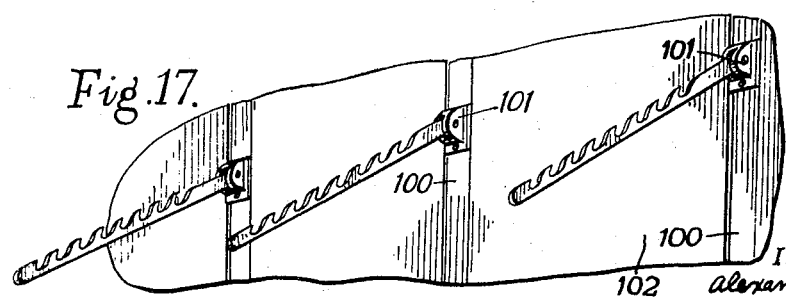

The invention is illustrated, by way of example, in the accompanying drawings, in which Fig. 1 illustrates in perspective a supporting member, with part broken away, and a clamping member attached thereto, for use in supporting structures of the invention, Fig. 2 is a cross-section through the supporting member shown in Fig. 1, illustrating one method of holding panels in position in the grooves in the side of the member by means of wedges and also the manner in which the clamp embraces the front T-sectioned part of the member, Fig. 3 illustrates in perspective a wedge for use in holding the panels in position as shown in Fig. 2, Figs. 4, 5 and 6 are views in front elevation, cross-section and side elevation respectively showing an alternative method of holding the panels in position and also another form of supporting member which may be used in supporting structures in accordance with the invention, Fig. 7 is a fragmentary view showing a modification of the panel supporting means shown in Figs. 4 and 5, Figs. 8 and 9 are views illustrating a rail supporting structure in accordance with the invention, Fig. 10 illustrates means for holding a supporting member as a free standing member, Figs. 11 and 12 illustrate in cross-section and perspective respectively a further form of supporting member for use in the structures of the invention and also shows a modified form of clamp and shelf-bracket, Fig. 13 illustrates in cross-section the manner in which the shelf-bracket shown in Fig. 12 may be used to support shelves, Fig. 14 illustrates in perspective a still further form of supporting member which may be used in the structures of the invention, and Figs. 15, 16 and 17 are pictorial representations of assemblies fitted to a wall for display purposes and embodying the supporting structures of the invention.

Referring to Figs. 1 to 3, 11 is a supporting member of strip-like form, formed with longitudinally extending channels 12, 13 in its sides and having its front part 14 of T-shaped cross section. The rear side walls 15, 16 of the channels 12, 13 are provided with holes 17 to take screws 18 for attachment to a wall 19 (see Fig. 2).

Openings 20 extend through the bottom wall 21 of the channels 12, 13 and each is adapted to receive a wedge 22 (see Fig. 3) which slides into the upper wider part of the opening and is then wedged into position in the lower, narrower part of the opening. In the latter position the wedge serves to hold wall panels 23 and 24 (see Fig. 2) in position in the channels 12 and 13 against the walls 15 and 16.

A clamping member 25 forming part of a shelf bracket 26 is formed with rearwardly extending cheeks 27, 28 having longitudinal grooves 29, 30 in the facing surfaces thereof. The clamp 25 is provided with a screw 31 passing through a screw-threaded aperture in the front wall thereof in screw-threaded engagement therewith.

The clamp 25 embraces the sidewardly extending portions of the front part 14 of the member 11 in free-sliding engagement therewith and is locked into position by screwing screw 31 inwardly to press against the front face of part 14 of member 11. This brings the rear side walls of the grooves 29 and 30 into contact with the rear faces of the sidewardly extending portions of part 14 and serves to bind the clamp 25 to the supporting member 11. The screw 31 need not be screwed in very tightly as when the clamp has been located in the desired position by the screw 31 any load applied to the bracket 26 exerts a tilting action on the clamp and binds it effectively to the supporting member.

The front part 14 of the member 11 is formed with cut-out portions, at intervals if necessary, as shown at 32, 33 so as to enable the clamp 25 to be fitted to the front part 14 of the member 11 and then to be moved upwardly or downwardly to engage the sidewardly extending portions of the front part 14.

Referring to Figs. 4, 5 and 6, the panel 34 is held in position in the channels 35 and 36 formed in the sides of the supporting members 37 and 38 by means of sidewardly extending bolts 39 attached to the panel at both sides at the top and bottom. The panel may be slid into position by first passing the top pair of bolts through gaps 40 (as shown in dotted lines in Fig. 6) then lifting the panel until the lower pair of bolts face the gaps 40 and can be passed through the gaps 40 into the channels 35 and 36. When this has been done the panel may be allowed to drop with the lower pair of bolts resting on stops 41 formed in the channels.

It will be seen that the supporting members 37 and 38 shown in Figs. 4, 5 and 6 have front and rear parts 42 and 43 of similar cross-sections. Such members may be used as free-standing members and carry clamps on both front and rear parts as shown in Fig. 6. The method of supporting the panels illustrated in Figs. 4, 5 and 6 may, however, be applied equally well to supporting members which are adapted to carry clamps on the front parts only.

As shown in Fig. 7 the bolts 39 may be made retractable, for inserting the panels, against the action of a spring 44 which returns the bolts to the engaging position when they have been inserted in the channels. The bolts may, naturally, also be manually returned to the engaging position by sliding in well-known manner. When the bolts are retractable the gaps 40 are not required.

Figs. 8 and 9 show a rail supporting structure utilising the supporting structure of the invention, Fig. 8 being a perspective view showing the rail carrying elements and Fig. 9 an exploded view of these elements.

The rail 45 is formed with cylindrical domed ends 50, 51 which fit over cylindrical domes 52, 53 carried by slides 54, 55. The slides 54 and 55 are adjustably mounted on cross-bars 56, 57, which are carried by slides 58, 59 which slide along brackets 60, 61. The brackets 60, 61 are formed with clamping members 62, 63 which engage the front parts of supporting members 64, 65 in the manner described in Figs. 1 and 2. The manner in which the slides 54 and 55 engage the cross-bars 56 and 57 and are locked thereon is similar to that in which the clamps 62, 63 engage the supporting members 64, 65. Similar also is the manner in which the slides 58 and 59 engage the brackets 60 and 61 and are locked thereon. It will be apparent that the arrangement illustrated provides a convenient and simply manufactured assembly in which the distance of the rails from the supporting members may be varied and any inequalities in the lengths of the rails may easily be taken up. In this arrangement also, panels may be provided between the supporting members.

Referring to Fig. 10 the means for holding a free-standing supporting member of the structure of the invention comprises a base plate 66 provided with holes 67 so that it may be screwed or bolted to a counter or floor. Pillars 68 and 69 are rigidly attached to the base plate 66. Pillar 68 is formed with cheeks 70 and 71 provided with grooves 72 and 73 and pillar 69 is formed with cheeks 74 and 75 provided with grooves 76 and 77. The pairs of grooves 72 and 73, and 76 and 77, are adapted to receive the T-sectioned portions 78 and 79 respectively of a supporting member 80 (shown in dotted lines and in part only).

In the construction described above the strip-like supporting members may conveniently be formed of aluminium extrusions and the clamps of aluminium castings.

Figs. 11 and 12 show a supporting structure which may conveniently be formed of sheet metal pressings. The supporting member is formed of two complementary strips 81 and 82 of stepped U-shaped cross-section fitting into one another. Screws 83 (one only shown) pass through both the strips 81 and 82 to attach the member as a unit to a wall 84. The sidewardly extending parts 85 and 86 of the strip 82 are bent back again to form grooves 87 and 88 adapted to receive a decorative strip (not shown) for hiding the screw heads and improving the appearance of the assembly. The clamp 89 forming part of the bracket 90 has its side edges 91 and 92 bent over to form grooves to fit over the parts 85 and 86 of strip 82. A screw 93 passing through the wall of the clamp 89 serves to lock it in position on the supporting member formed of strips 82 and 81.

The shelf-supporting part of the bracket 90 may have bent over edges 91a and 92a forming grooves adapted to receive the bent over ends 94 of adjacent metal shelves 95 and 96 as shown in section in Fig. 13. The grooves formed by the bent over edges 91a and 92a may also be used to receive a slide provided on the bottom of a shelf.

Fig. 14 shows a supporting member 97 formed of a hollow extrusion having channels 98 in its sides. The clamp 99 fits on to the supporting member in the manner described above.

Figs. 15, 16 and 17 show pictorially display assemblies comprising supporting members 100 and clamping members 101 of the construction illustrated in Figs. 1 and 2. Peg boards 102 form the panels between the strip-like, supporting members 100. More decorative forms of panels may be used, depending on the nature of the articles to be displayed.

It will be seen that the supporting structures of the invention provide neat and unobtrusive display fittings, presenting relatively smooth and attractive surfaces to the viewer. They also enable a wide variety of adjustable assemblies to be built up and the backgrounds furnished by the panels may also be easily changed for different displays. When aluminium extrusions are used as the supporting members, the appearance may still further be improved by polishing the aluminium extrusions mirror bright, or by anodising or dyeing the extrusions in a wide range of colours. Furthermore strips of decorative plastic materials may easily be glued to the flat front faces of the supporting members.

When using a hollow supporting member as shown in Fig. 11 or Fig. 14, electrical wiring for lighting a display may conveniently be run through the supporting member.

I claim:

1. A supporting structure for shelves, display fittings and similar articles comprising a supporting member formed of a strip-like member of approximately U-shaped cross section with the sides in step-shaped configuration directed inwardly thereof and towards a rear part of the member, and a complementary, strip-like member fitting thereinto so as to form a box-shaped unit, the free edges of said first-mentioned strip-like member being bent outwardly to form sidewardly extending flanges, said complementary member having a flat front portion in substantial alignment with the flanges and its sides interfitting with the sides of the supporting member.

2. A supporting structure according to claim 1, in which the ends of the outwardly bent flanges are bent inwardly again to form longitudinally extending grooves to receive a strip of decorative material to cover the front face of the box-shaped unit.

3. A supporting structure according to claim 1 in which a clamp member is provided having a wall with rearwardly extending side cheeks which are formed with longitudinally extending grooves facing each other and embracing the sidewardly extending flanges of the supporting member so that the clamp is in free sliding engagement with the supporting member, and in which means are provided for locking the clamp in position on the supporting member.

4. A supporting structure according to claim 1, in which at least two of said supporting members are provided spaced from one another and attached to a wall and a panel extending between the said two supporting members and held in position in channels formed by the stepped-back portions and the wall.

References Cited in the file of this patent

UNITED STATES PATENTS

| | | |
|---|---|---|
| 139,408 | Meigs | May 27, 1873 |
| 304,792 | Butz | Sept. 9, 1884 |
| 318,343 | Baublits | May 19, 1885 |
| 565,274 | Hurrel | Aug. 4, 1896 |
| 922,919 | Lawrence | May 25, 1909 |
| 982,279 | Knape | Jan. 24, 1911 |
| 1,741,979 | Dawson | Dec. 31, 1929 |
| 1,773,704 | Bohnsack | Aug. 19, 1930 |
| 1,791,006 | Shorr | Feb. 3, 1931 |
| 2,078,478 | Allen | Apr. 27, 1937 |
| 2,191,701 | Wood | Feb. 27, 1940 |
| 2,644,591 | McMahan | July 7, 1953 |
| 2,710,241 | Lieberman | June 7, 1955 |
| 2,744,714 | Parke | May 8, 1956 |

FOREIGN PATENTS

| | | |
|---|---|---|
| 164,452 | Great Britain | June 3, 1921 |
| 855,905 | Germany | Sept. 18, 1952 |